(12) United States Patent
Reichhart

(10) Patent No.: US 10,975,908 B1
(45) Date of Patent: Apr. 13, 2021

(54) METHOD AND DEVICE FOR MONITORING A BEARING CLEARANCE OF ROLLER BEARINGS

(71) Applicant: Schaeffler Monitoring Services GmbH, Herzogenrath (DE)

(72) Inventor: Marc Reichhart, Fuerth (DE)

(73) Assignee: Schaeffler Monitoring Services GmbH, Herzogenrath (DE)

( * ) Notice: Subject to any disclaimer, the term of this patent is extended or adjusted under 35 U.S.C. 154(b) by 0 days.

(21) Appl. No.: 16/667,368

(22) Filed: Oct. 29, 2019

(51) Int. Cl.
| F16C 19/38 | (2006.01) |
| F16C 19/52 | (2006.01) |
| G01M 13/04 | (2019.01) |
| F16C 41/00 | (2006.01) |
| G01L 5/00 | (2006.01) |

(52) U.S. Cl.
CPC ............ *F16C 19/38* (2013.01); *F16C 19/522* (2013.01); *G01L 5/00* (2013.01); *G01M 13/04* (2013.01); *F16C 41/00* (2013.01); *F16C 2233/00* (2013.01)

(58) Field of Classification Search
CPC ...... F16C 19/38; F16C 19/383; F16C 19/522; F16C 19/546; F16C 41/00; F16C 41/008; F16C 2233/00; G01M 13/04; B01F 2015/0011; B01F 2015/00129; G01L 5/00
USPC ............... 384/448, 504, 520, 548, 565, 571; 73/426
See application file for complete search history.

(56) References Cited

U.S. PATENT DOCUMENTS

| 6,070,325 | A | 6/2000 | Miyata et al. |
| 6,766,697 | B1 * | 7/2004 | Perez ...................... F16C 17/03 |
| | | | 73/800 |
| 9,945,417 | B2 | 4/2018 | Moravec et al. |
| 10,018,524 | B2 | 7/2018 | Mol |
| 10,345,193 | B2 | 7/2019 | Jakobsen |
| 2002/0157470 | A1 | 10/2002 | Noetzel et al. |
| 2017/0122366 | A1 * | 5/2017 | Kuhlmann ............. G01B 5/146 |
| 2017/0260968 | A1 | 9/2017 | Tsutsui et al. |
| 2017/0299365 | A1 | 10/2017 | Bridges et al. |
| 2020/0284617 | A1 * | 9/2020 | Davies ................ F16C 32/0446 |

FOREIGN PATENT DOCUMENTS

| CH | 702986 A2 | 11/2011 | |
| CN | 103703263 B * | 10/2017 | .............. F16C 43/04 |
| CN | 107387551 A * | 11/2017 | |

(Continued)

*Primary Examiner* — Marcus Charles
(74) *Attorney, Agent, or Firm* — Muncy, Geissler, Olds & Lowe, P.C.

(57) ABSTRACT

In the methods for monitoring a bearing clearance of a roller bearing (4), in particular the bearing clearance of a main bearing of a wind turbine, within the scope of a first measuring series using at least one distance sensor (18), a distance (a, $a_1$, $a_2$) between a rotating part (12) and a stationary part (14) is respectively sensed in at least two different recurring load states (L1, L2), and a difference ($\Delta a$) between the measured distances ($a_1$, $a_2$) is determined. At a later time the distance measurements are repeated in the same at least two recurring load states (L1, L2) within the scope of a second measuring series. A change in the bearing clearance is inferred on the basis of the changes in the distance difference ($\Delta a$) within the scope of condition monitoring.

19 Claims, 3 Drawing Sheets

(56) References Cited

FOREIGN PATENT DOCUMENTS

| | | | | |
|---|---|---|---|---|
| DE | 2801729 | A2 | 12/2004 | |
| DE | 10324924 | A1 | 12/2004 | |
| DE | 102007026569 | A1 | 12/2008 | |
| DE | 102009051498 | A1 | 5/2011 | |
| DE | 102010035264 | A1 | 3/2012 | |
| DE | 202012011902 | U1 | 1/2013 | |
| DE | 102014014039 | A1 | 3/2016 | |
| EP | 1528356 | A2 | 5/2005 | |
| EP | 2431622 | A1 * | 3/2012 | .............. F16C 33/34 |
| EP | 2781774 | A1 | 9/2014 | |
| EP | 2801729 | A2 * | 11/2014 | .............. F16C 19/52 |
| EP | 2902134 | A1 * | 8/2015 | ......... B22D 11/0622 |
| EP | 3196627 | A1 | 7/2017 | |
| EP | 3208571 | A1 | 8/2017 | |
| EP | 3385552 | A1 * | 10/2018 | ............ F16C 23/086 |
| EP | 3483581 | A1 * | 5/2019 | ............ G01M 13/04 |
| GB | 1572281 | A | 7/1980 | |
| JP | 2004184297 | A | 7/2004 | |
| JP | 2013024310 | A * | 2/2013 | ........ B01F 15/00201 |
| WO | WO-2015093351 | A1 * | 6/2015 | ........ B01F 15/00201 |
| WO | WO2016/096418 | A1 | 6/2016 | |
| WO | WO2017013999 | A1 | 1/2017 | |

* cited by examiner

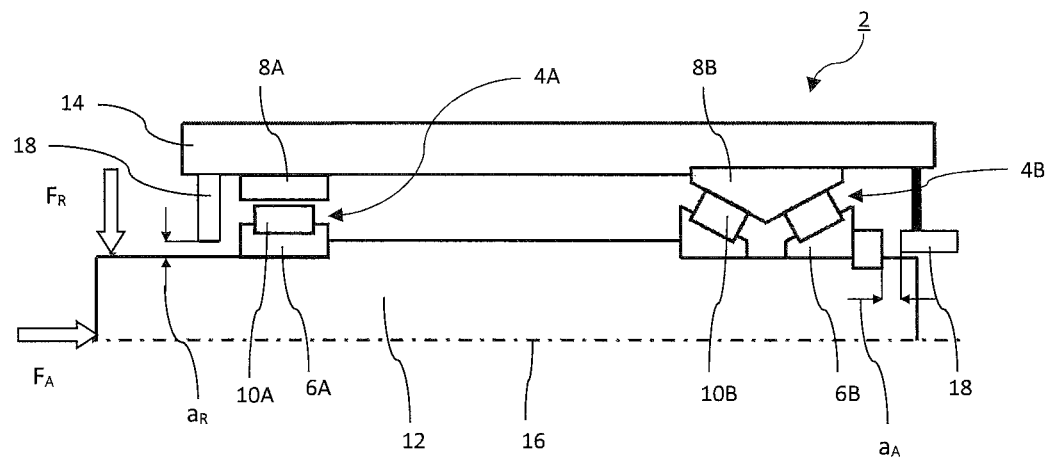
FIG 1
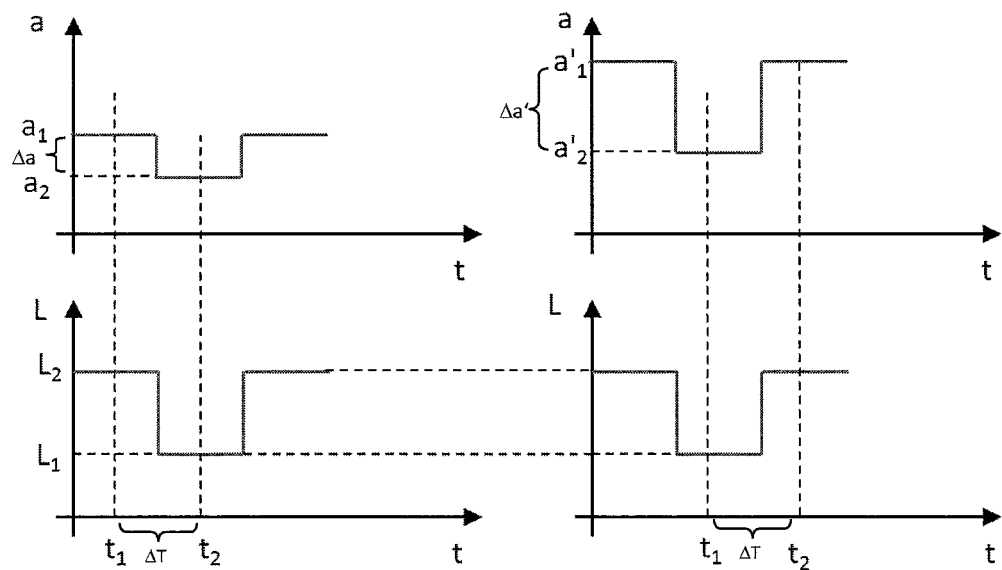
FIG 2A
FIG 2B

METHOD AND DEVICE FOR MONITORING A BEARING CLEARANCE OF ROLLER BEARINGS

BACKGROUND OF THE INVENTION

Field of the Invention

The invention relates to a device and to a method for monitoring the state of the bearing clearance of a roller bearing, in particular the bearing clearance of a large bearing, specifically of a wind turbine, and in particular of a main bearing.

Description of the Background Art

State monitoring is in this case performed after the roller bearing is installed. Bearing clearance is understood to mean both a positive bearing clearance with bearing play and a negative bearing clearance (preloaded bearing) of roller bearing units. A roller bearing unit means in particular an individual bearing with attached parts (for example torque bearing) or a shaft system consisting of a shaft and a housing and any number of roller bearings.

The bearings to be monitored are in general rotary bearings, that is to say bearings that rotate continuously about an axis of rotation during operation (and do not pivot just within a limited angular range about an axis of rotation). The bearing to be monitored is specifically a bearing of a wind turbine, for example what is known as the main bearing, via which a rotor, to which rotor blades are fastened, is mounted.

The focus in this case lies on the simplest possible but at the same time precise sensing of damage that influences the bearing clearance, such as wear of the raceways or of the rolling bodies, wear in the bearing seat or impermissible setting or releasing of preloading or fixing elements. Bearing clearance is a decisive factor for the function of a bearing system. If the bearing clearance increases (when it is positive) or the bearing preload is reduced due to said mechanisms, this leads, in the medium or long term, to consequential damage to the bearing system, as far as failure thereof. If however an impermissible bearing clearance change is detected in good time, corresponding measures may be taken in order to avoid consequential damage.

There are already a few approaches that deal with measuring the bearing preload and/or the influence thereof.

DE 10 2010 035 264 A1 describes a device for setting an axial clearance of a bearing by way of piezo actuators. The aim of the device is to compensate changes in operating clearance caused by temperature influences. For this purpose, the axial distance to the bearing inner ring is measured by way of a sensor arranged on the housing. If the distance changes, this is corrected by the piezo elements until the starting state is recreated. It is however not possible to use this method to monitor wear, setting or releasing. This is due to the fact that wear on the bearing having the adjustment device leads for example to an increase in distance, and wear on the opposing bearing leads to a reduction in distance. The effects may thus cancel one another out. The measurement is additionally overlaid with considerable temperature effects resulting from normal operation. Such a device is therefore not suitable for monitoring the condition of a bearing clearance, but rather only for compensating thermal expansions.

DE 10 2009 051 498 A1 provides a preload measurement apparatus, wherein the radial distance between outer and inner ring is measured. The distance measured value is likewise used to adjust the operating clearance in the case of a temperature influence, wherein it is the intention here to correct the operating clearance by adjusting the temperature of one of the bearing rings. It is also the case here that wear of the raceways and/or rolling bodies is not able to be detected unambiguously, since the measurement is distorted, on the one hand, by the temperature effects. On the other hand, wear would not necessarily cause a change in the radial distance, if for example only axial load changes were to be present.

Both of the abovementioned approaches thus target the adjustment or constant maintenance of the operating clearance by compensating temperature influences, but are not however able to detect long-term changes to the preload or the bearing clearance caused by wear, setting or releasing.

Since the temperature distribution in the bearing unit in particular has a very large influence on the operating clearance, this influence has to be ruled out or at least sufficiently minimized in the measurement and evaluation in order to be able to detect wear, setting or releasing.

EP 2 801 729 A2 by contrast offers a solution approach for this. A conclusion is likewise drawn here about the bearing preload by way of a measurement of the distance, radial and axial distance measurements however being provided here. In connection with additional temperature distribution measurements on the bearing, it is possible here to draw an unambiguous conclusion about the bearing preload that is present and additionally to draw a distinction between temperature and wear influence. However, these measurement methods require a multiplicity of sensors and complex preliminary calculations in order to determine the correlations.

One common feature of the cited prior art is that load changes during operation may greatly distort the control and/or measurement result, since such load changes likewise lead to distance changes.

All bearings furthermore have fabrication deviations. These may be axial run-out and concentricity defects, flatness and roundness deviations or surface defects. If the distance between a rotating and a stationary part is measured during operation, this is expressed in a periodically varying distance signal, wherein the absolute distance change may considerably exceed the change on which the measured target is based due to fabrication deviations. If this is not taken into account in the evaluation, this may lead to extremely large scatter in the measurement result and call it into question.

SUMMARY OF THE INVENTION

The present invention is based on the object of allowing state monitoring for roller bearing systems with low measurement and calculation expenditure, and nevertheless reliably detecting wear, setting and releasing. The aim here is thus to monitor the bearing clearance over the long term following installation and not to determine or to correct the operating clearance depending on the temperature distribution in the bearing.

The object is achieved according to the invention by way of a method having features as disclosed below and by way of a device having features as disclosed below. The advantages and preferred configurations stated with respect to the method may be applied analogously to the device.

The method serves for monitoring a bearing clearance of a roller bearing, in particular a bearing clearance of a large bearing, specifically of a wind turbine, and in particular for monitoring the bearing clearance of the main bearing of a wind turbine. In this case, for the monitoring within the scope of a first measuring series using at least one distance sensor, a distance between a rotating part and a stationary part of the roller bearing is respectively sensed in at least two in particular periodically recurring load states, on the basis of the measurements, there is a difference between the measured distances, also referred to below as distance delta; this difference for the at least two recurring load states is preferably determined from the measured distances, at a later time, the distance measurements are repeated in the at least two load states within the scope of a second measuring series. On the basis of the change in the distance differences (distance delta), changes in the bearing clearance are inferred. In the second measuring series as well, a distance delta is in particular determined and monitored for a change in comparison with the distance delta of the first measuring series.

Changes in the bearing clearance are thus generally inferred on the basis of the changes in the difference (the distance delta). On the basis of the change, in particular when the distance delta increases or decreases by a predefined value (in absolute terms and/or as a percentage), an impermissible change is for example inferred and appropriate measures are taken, such as for example recommending readjustment of the bearing clearance or recommending a bearing change. As an alternative or in addition, a prediction about the further (remaining) service life of the bearing, possibly as far as a required revision, etc., is made on the basis of the change in the distance delta (condition monitoring).

In the method, at least two individual measurements are therefore preferably initially performed in different load states in the first measuring series and at least two distance values (one distance value per load state) are obtained. In this case, for example, two absolute values are sensed (measured) and correlated with one another in order to obtain the distance difference. As an alternative, the distance difference is sensed and determined by a relative measurement, that is to say only the distance change is sensed, without an absolute value for two distance values being measured. Later on in the course of operation (for example after weeks or months following the first measuring series) and in the scope of the condition monitoring, at least two individual measurements are then carried out again in the second measuring series in the same or at least comparable load states as in the first measuring series, and at least two distance values are again sensed.

It is particularly important that a statement about the bearing clearance is made not on the basis of an absolute, possibly also averaged distance measurement, but rather solely on the basis of the change in the distance delta in the temporal profile in at least two defined load states. This is achieved in particular by a relative measurement. The essential advantage in this case is that the influence of the varying load states for the bearing clearance specifically does not have to be sensed and calculated in a complex manner.

In a respective individual measurement for determining the distance in a defined load state, the distance is for example measured continuously over a certain time period (for example several seconds to minutes) and a mean value is formed as distance value from the plurality of measured values. In order to determine the distance delta, the distance between the mean values in the various load states is then used for example.

The method exploits the changeable load states that are present in a majority of applications, which by contrast constitute a problem in the approaches described above from the prior art. Depending on the (positive or negative) bearing clearance, specifically different load-dependent distances result between the bearing rings, their attached parts (such as for example bearing seat, a clamping ring for clamping the bearing, etc.) and/or shaft and housing. If measurement is performed at a particular site, the distance here changes depending on the load state due to elastic deformations of the components. Load state is understood to mean a combination of particular forces, torques, temperatures, rotational speed etc. at a discrete time, wherein a load state may also be a load-free state.

Load states are considered in this case in particular to be the following varying load states:

Temperature-induced load states: Temperature variations may cause different expansion behavior of the individual components that may lead to a variation in the bearing clearance, for example in the rest state and in an operating state Wind load-induced load states: Different wind loads introduce different forces into the bearing that may likewise lead to a change in the bearing clearance Rotational speed-dependent load states, for example caused by different centrifugal forces In the simplest case, in one application, the load state changes between two levels, for example two different temperature levels or two different wind loads. It is thus possible to determine a relative distance change between the two load states. As long as the bearing clearance remains constant, an identical load state change also gives an identical distance delta. If damage that influences the bearing clearance occurs (bearing clearance increases or preload decreases), this always leads to an increase in the distance delta with an identical load state change. By monitoring the delta (trend formation), a change in the bearing clearance is thus detected. In this procedure, it is not absolutely necessary to know the exact load states or the current bearing clearance. It is assumed that, when put into service, a suitable bearing preload is present and the load states recur identically over time. This is the case in most applications.

A permissible increase in terms of percentage is for example defined, beyond which the bearing has to be examined in more detail. If the load states are known, the change in clearance is however also preferably inferred precisely by a previous calculation and/or by using a correlation stored in an evaluation unit.

The loads may be radial loads, axial loads or torques that thus act on the bearing in the radial direction or in the axial direction or in the form of tilting.

In the case of a radial bearing, for example a radial roller bearing provided with clearance as floating bearing, a distance between the housing and the shaft is for example sensed. If the radial load is an alternating load, that is to say if the direction of the load changes (load direction reversal) between two load states, the clearance is able to be easily determined by way of the measurement and a clearance increase is readily able to be sensed (increasing distance delta over time). The system however also works when increasing loading is present. Increasing loading is understood to mean that the magnitude of the loading changes, but the direction of the load however remains virtually the same.

This is due to the fact that more rolling bodies contribute in the case of a small bearing clearance than in the case of a large bearing clearance. The bearing rigidity is therefore higher in the case of a small bearing clearance than in the case of a large bearing clearance. A different distance delta accordingly likewise thus results in the case of an increasing load depending on the bearing clearance.

It is similarly the case for a preloaded bearing that the measured delta turns out to be lower in the case of a large preload.

In one expedient development, a change between two predefined load states is sensed, for example the change between two rotational speed levels, between two temperature levels or between two defined wind load states. The load states are sensed for example by suitable sensors and/or they are obtained from a turbine controller. If the respectively defined load state in which the respective measuring series should be performed is present, then the distance is sensed. There is typically a certain time period of seconds, minutes, hours or else days between the distance measurements in the at least two defined load states, since the change between the two load states requires a certain amount of time. The time period in this case depends in particular on the type of load change. Wind load-induced stochastic load changes thus occur for example in very short time periods in the region of a few seconds. In the case of such (stochastic) load changes, the time period is for example in the region of a few 10 s of seconds (for example up to a maximum of <1 min, <5 min or <10 min). In the case of load changes caused for example by startup of the turbine (cold—operating temperature), the time period is for example in the region of a few 10 s of minutes up to an hour or else up to several hours, for example up to 6 or else up to 10 hours.

If two known, in particular periodically recurring, load states are present in a roller bearing application, such as for example in the case of changing from a load-free state to a defined operating state in the partial load or full load region, and if the time of the load change is known, a change from one to the other load state is sensed, preferably during a measuring series that lasts over a time period that extends at least over the load change, and the two distances before and after the load change are determined.

If the time of the load change is not known, measurements are preferably performed over a sufficiently long time period so that at least one change, and therefore a distance delta, is sensed within this time period. This time period is for example in the region of hours, days or even weeks. By contrast, the individual measurement of the distance as such lasts just a few seconds up to for example a few minutes (1-3 min).

In one preferred configuration, the different load states are generated in an intentional manner, that is to say set by controlled interventions for example in the turbine controller. This is for example the change from a cold state to an operating temperature state when starting up the turbine.

In many roller bearing applications, however, there are more complex load state changes. The main bearing of a wind turbine is intended to serve here as a particularly complex example. A main component of the relevant load changes results from stochastic changeable wind loads, that is to say a random load temporal behavior is present over a short time period. Load temporal behavior is understood to mean the change in the load state within a time interval. A short time period is understood here to mean a time period of typically several seconds, for example 5 to 20 sec up to a few minutes (1-10 min). This random short-term load temporal behavior however recurs at least in a similar form over a long time period. Stochastic variations, that is to say deviations, thus occur for example in the case of a constant mean wind speed. Experience shows that these deviations are identical or highly similar within the scope of a statistical observation. These load deviations are therefore accompanied by different distances.

In one preferred configuration, a measuring series having a multiplicity (at least 10, preferably at least 50 and more preferably at least 500) individual measurements is therefore carried out at for example a frequency in the region of for example 1 to 100 Hz, for example 10 Hz, over a predefined measurement time period, in particular in the region of several seconds to a few minutes (1-10 min). An in particular periodically recurring load temporal behavior of the distances is thereby sensed. A continuous profile, as it were, of the distances over the measurement time period is thus sensed. This profile is evaluated with regard to the differences between the distances. The differences are in this case caused by the (stochastically) changeable loads. Such a measuring series is carried out at a later time as the second measuring series in the scope of the condition monitoring. The two measuring series are evaluated, specifically on the basis of the changes in the difference between the individual distance values of the respective measuring series.

The two measuring series are in this case preferably carried out with an identical basic load, that is to say an identical basic load state, within which the stochastic deviations occur. Specifically, this basic load state is defined by a constant mean load (for example wind speed (wind load)). The basic load state is for example an identical mean load (wind speed) over the time period for carrying out the measuring series, and preferably also having an identical or similar stochastic variation (standard deviation or variance) of the mean load (wind speed) in the measurement time period.

The invention thus exploits the stochastic changes, since the aim is long-term monitoring of the bearing clearance. Measuring series are thus carried out regularly over a discrete time period (a few seconds to several minutes). A series of measurements is thus carried out. Within such a measuring series, there are stochastic changes in the load state and thus a stochastic variation in the distance signal. It is thus possible to determine for example a difference between the maximum and minimum within such a measuring series (that is to say when a single load state is present) and to evaluate this with regard to a change in the bearing clearance.

Such a method would however be subject to considerable scatter if the results of several measurements were to be compared. It is therefore preferably proposed to determine a statistical characteristic value as a measure of the difference between the measured distances and to check this statistical characteristic value for changes. The statistical characteristic value is in particular the variance or the standard deviation of the individual measured values. There is in principle also the possibility of checking just a simple mean value of the distances measured within a measuring series for a change between the measuring series.

One distance sensor is in principle sufficient for monitoring the bearing clearance, which distance sensor is as far as possible positioned at a site where the greatest deformations or displacements between rotary and stationary parts occur depending on the design of the bearing and the load states of the application. For this purpose, the distance measurement does not necessarily have to take place in the immediate surroundings of the bearing. The effect is often even amplified by the lever effect at some distance from the bearing. It does however need to be ensured in the positioning that other deformation effects caused for example by other machine elements do not impermissibly influence the result.

It is furthermore advantageous for the sensor to be accessible in order to be able to exchange it if necessary. If this is not able to be implemented, a plurality of sensors may also be placed directly next to one another for redundancy purposes.

A further key challenge is that of sensing the distance signal and evaluating it. Due to tolerances and mechanical deviations during fabrication or installation errors, axial, planarity, flatness and roundness deviations, that is to say in general axial run-out and concentricity defects, are unavoidable. Concentricity defects are understood in general to mean radial variations in the distance of a rotating, radial surface of a rotating component with respect to the axis of rotation. Axial run-out defects are understood in general to mean deviations of a planar end face of the rotating component from an exact flat plane (oriented perpendicular to the axis of rotation). Since the system is measured from stationary to rotating (or vice versa), a different measured value results in the stationary state depending on the angular position of the rotating parts with respect to one another, or else, in the case of a measurement during operation, a sometimes greatly varying distance value over time. This is the case in particular when measurement is performed not on a bearing ring but rather for example from the housing on a part attached to the shaft (for example shaft nut) that does not have any particular form and positional tolerances on the measurement surface, in the case of which large concentricity defects or axial run-out defects should thus be expected.

In particular in the case of using just one sensor, this problem is preferably solved in that the installation or fabrication deviations, hereinafter referred to as fabrication deviations for short, are sensed by a measurement and compensated by an evaluation unit. The fabrication deviations are preferably sensed within the scope of a reference measurement and taken into account in the later measurement of the distance values. The bearing unit is rotated for the reference measurement (at least one or else a plurality of revolutions), wherein the angular position and the associated distance are sensed and permanently stored in an evaluation unit. The reference measurement is preferably carried out in a load-free state. It is at least ensured throughout the duration of the reference measurement that the load state of the bearing unit does not change during the reference measurement. In later measurements during operation, the distance change caused by fabrication deviations is then preferably subtracted from the measurement result.

For this purpose, the values of the reference measurement are correlated with the operating measurement, preferably in terms of position or time. This is achieved for example by additional angular position sensing, that is to say the values of the distance are sensed at defined angles of rotation and only distance values that were sensed at the same angles of rotation are compared with one another.

It is particularly advantageous to provide at least one mark on a measurement surface against which the distance sensor measures. Such a mark may be for example an indentation or an elevation. By virtue of the corresponding deflections (caused by an abrupt distance change due to the indentation/elevation on the measurement surface) in the distance signal measured over the course of time (time signal), the reference measurement is correlated with the operating measurement by assigning the deflections to one another. By virtue of the mark, the rotational orientations/angular orientations in the reference measurement and the later distance measurements are thus correlated, as it were.

If necessary, the reference measurement is preferably expanded or contracted in order to compensate rotational speed differences. What is important for the deflections is that they are situated above the level of the expected distances during operation. That is to say, the indentation or elevation is greater (for example by at least a factor of 1.5 or 2) than a maximum expected change in the distance to be measured.

Three or more distance sensors are advantageously used, wherein it is furthermore advantageous to distribute them at identical angular distances around the circumference. The individual distance deltas (differences between the load states) of the individual distance sensors are then each advantageously used for the evaluation.

The simultaneous mean value of the plurality of distance sensors and the distance delta of the mean value are preferably in particular additionally sensed in a respective measuring series. Simultaneous mean value is understood to mean that the plurality of distance sensors sense the distance values at the same time (but still at different (angular) positions) and these distance values are averaged. The sum of the measured individual distances (at a discrete time) of the plurality of sensors is for this purpose divided by the number of sensors. This simultaneous mean value is in each case used as measured distance value for the different load states and then monitored for changes in the difference between the measured distances.

This has the major advantage that interfering influences such as axial run-out defects and concentricity defects are reduced. If an axial runout defect or concentricity defect were to be a simple sinusoidal profile, the distorting influence would be eliminated by such evaluation. Since however an often sinusoidal profile is overlaid with random deviations (for example wavy or local elevations/indentations), a periodic distance change likewise forms in the simultaneous mean value during one rotation (360°). The amplitude of this distance change is however much smaller than that of the individual distance measurements with the individual distance sensors. The periodicity, that is to say frequency of the distance change, is given by the product of the rotational frequency of the shaft and the number of sensors.

The current rotational speed is therefore also able to be calculated from the distance signal. This is preferably also calculated. There are various options here for example for sensing the time between two deflections of the abovementioned marks or using FFT analysis. The rotational speed may in turn be used for further evaluations.

One particularly advantageous method for sensing the component of the fabrication deviations in the distance signal is that of phaseshifting the measurement signals of the individual distance sensors. In this case, the individual measurement signals are (temporally) shifted according to their angular position, that is to say the angular position of the associated distance sensor, so that they overlap one another congruently. That is to say, the individual measured values (distance values) or sensor signals are temporally shifted such that they overlap one another. The measured values with regard to the same measured angular position then in each case thus overlap one another and are able to be averaged. The mean value is used as distance value. The distance change caused by fabrication deviations is thereby able to be extracted relatively accurately, even when changes in the load state occur during the measurement.

In particular if the distance deltas caused by the load changes are large in comparison with the fabrication deltas, the measurement is preferably evaluated and averaged over a plurality of revolutions. This may then in turn be subtracted from the individual signals. As a result, the deviation of the distance signals decreases significantly and it is possible to extract the distance change caused by the load state.

Compensation of the distance change due to concentricity deviations and axial run-out deviations is advantageous in particular if statistical characteristic values are intended to be determined in order to determine the distance delta, such as for example the standard deviation of the distance variation, during a measuring series in one load state. Otherwise, the distance variation caused by the fabrication tolerances would possibly be dominant, such that the increase in the distance delta caused by changes in the bearing clearance would be subordinate in the evaluation.

However, it is also of interest in principle to monitor the concentricity behavior and axial run-out behavior over time. Since the concentricity behavior and axial run-out behavior are extracted by way of the methods described above, in particular averaging the distance values over at least one full revolution, it is also possible to monitor these in terms of quality. If for example a bearing ring is installed incorrectly such that a gap is partly present in the bearing stop surface, this has an effect on the concentricity profile or axial runout profile of the distance measurement. If setting occurs later during operation, such that the gap closes, the axial run-out behavior and concentricity behavior changes in terms of quality. This naturally also leads to a change in the bearing clearance.

In the simplest case, the concentricity behavior and/or axial run-out behavior is carried out by a further reference measurement in a defined load state and in particular compared with the earlier reference measurement.

If constant load states are present over a plurality of revolutions, there is furthermore provision, in one preferred development, to eliminate changes in the distance values caused by fabrication deviations by forming a floating mean value in order to (exactly) determine the present distance value caused by the current load state and to determine the distance delta to other load states. To this end, the periodic nature of the distance signal is preferably utilized. Since the rotational speed is able to be determined from the signal as described above, it is possible to define the region for the floating mean as n times a rotor revolution, wherein n is greater than or equal to 1 and is preferably 2 and is at most 10. It is thereby possible to completely eliminate the axial run-out influence and concentricity influence in the measurement. This is due to the fact that the mean value of the axial run-out profile and concentricity profile is constant over one rotor revolution or multiples thereof.

In most roller bearing applications, various operating conditions, such as for example partial-load or full-load operation, may be present. The level of the load state change also generally differs for the various operating conditions. In order nevertheless to be able to form meaningful trends of the distance delta or of the axial run-out behavior and concentricity behavior, the relevant operating parameters are preferably sensed and the measurement results of the distance delta are classified accordingly. The temperature of the bearing unit in particular plays an important role here. It is therefore advantageous already to integrate a temperature sensor into the distance sensor. This makes sense in particular if a measurement method is selected in which the distance sensor already has a temperature drift (for example inductive distance sensor). The temperature measured value may then be jointly used to classify the distance delta.

If an evaluation unit is mentioned, this does not necessarily mean that it is a separate unit in this case. The hardware or the evaluation algorithms and logic units may in this case be partly or fully integrated into a superordinate system. It is advantageous for example to evaluate the distance measurements in an evaluation unit. The result may then for example be forwarded to a pre-existing monitoring system, where the classification is then performed using operating state parameters and trend formation.

The above-described methods for evaluating the distance measurement are preferably performed continuously. For this purpose, the for example floating measured data are loaded into a buffer memory over a required discrete time period and continuously evaluated and output. The output of course then starts at a delayed time from the start of the measurement, since a certain number of measured values or a certain measurement profile first of all needs to be present in order for example to be able to carry out FFT analysis or floating mean value formation. Under some circumstances, this requires a large amount of computational power. It is however also possible to carry out discrete measurements at regular intervals, to then evaluate them and to output the evaluated value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a sectional illustration of a bearing unit in which different bearing states are shown for illustrative purposes, FIG. 2A shows a temporal profile of a load state and, in correlation therewith, the temporal profile of a distance between a rotating and a stationary part in a starting state of the bearing and FIG. 2B shows the profiles according to FIG. 2A, but after a certain operating time and in the case of wear.

DETAILED DESCRIPTION

Figures 3A, 3B:
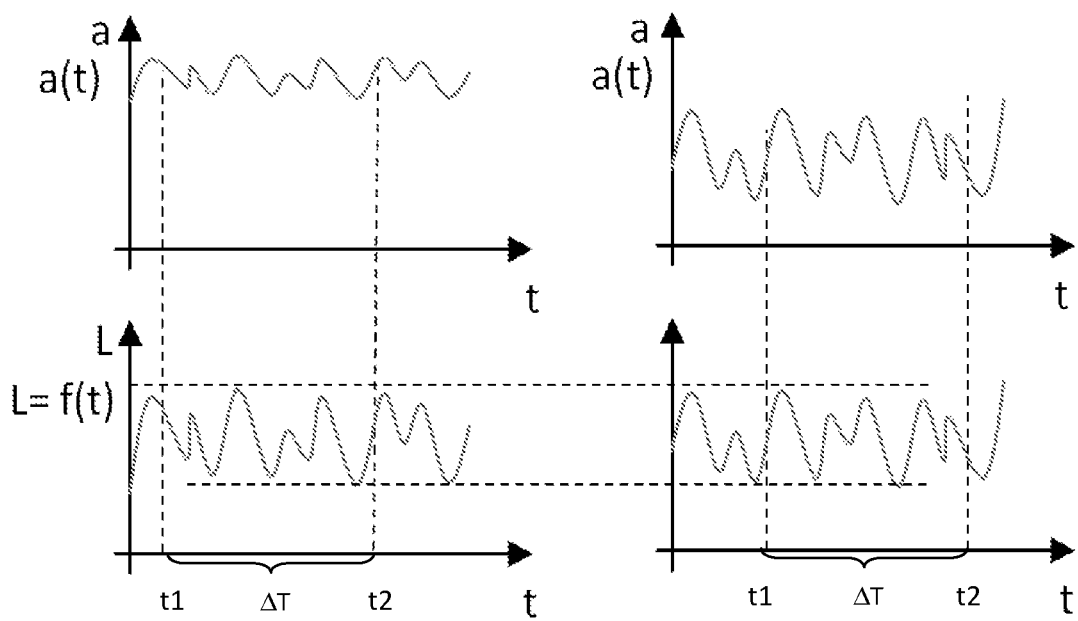
FIG. 3A shows the temporal profile of a stochastically varying load state and a profile, in correlation therewith, of the distance between a rotating and a stationary part in a starting state of the bearing
FIG. 3B shows the profiles according to FIG. 3A, but after a certain operating time and in the case of wear.

FIG. 1 illustrates a bearing unit 2 by way of example and in highly schematic form. The illustrated bearing unit 2 is not necessarily a real situation, but rather FIG. 1 serves to explain different states. In the illustrated FIG. 1, the bearing unit 2 has two roller bearings 4 that are spaced from one another. The roller bearing 4B illustrated in the right-hand half of the image is in this case designed as a double-row, mounted and preloaded roller bearing. The roller bearing 4A illustrated in the left-hand half of the image is by contrast designed as a single-row roller bearing in the form of a floating bearing with positive bearing clearance (in contrast to the negative bearing clearance in the case of a preloaded bearing).

A respective roller bearing 4A or 4B in each case has at least an inner ring 6A or 6B, an outer ring 8A or 8B and rolling bodies 10A or 10B arranged between them. In the case of the roller bearing 4A illustrated in the left-hand half of the image with the positive bearing clearance, what is known as bearing play is therefore formed and illustrated between the rolling bodies 10A or 10B and one of the rings 6A or 6B, or 8A or 8B-64.

The roller bearings 4A, 4B generally serve to mount a rotor 12 opposite a stator 14. In the exemplary embodiment, the inner part is designed as a rotor 12 that rotates about an axis of rotation 16 during operation. The rotor 12 is in this case often also referred to as a shaft. The stator 14 is for example a (bearing) housing of the overall bearing unit.

The method described here is used in particular in the case of large bearings, and specifically in a main bearing of a wind turbine. Large bearings are generally understood to mean bearings that are designed for high payloads of for example several tonnes and typically have a diameter of greater than 0.5 meters, and in particular greater than two meters. The main bearing of a wind turbine is such a large bearing. By way of the main bearing, a rotor, not illustrated in more detail here, of the wind turbine is mounted, which rotor bears a rotor hub on the end thereof. The individual rotor blades are arranged on said rotor hub, by way of which rotor blades the wind power is received and converted into a rotational movement of the rotor.

The method described here is however not necessarily restricted to such large bearings. Correctly setting and maintaining a bearing clearance is however of critical importance for the functionality of the bearing unit 2 precisely in the case of such large bearings.

In this case, both radial bearing forces $F_R$, axial bearing forces $F_A$ and torques M may occur during operation. These bearing forces in this case vary in a load-dependent manner, that is to say depending on the loads currently acting on the individual bearing components. Specifically due to the size of the bearing unit 2, such load changes are reflected in particular in distance changes between a rotating part, for example the rotor 12, and a stationary part, for example the stator 14.

FIG. 1 illustrates two distance sensors 18 by way of example, these being designed to measure a radial distance $a_R$ or an axial distance $a_A$. The distance sensors 18 here in each case perform measurements onto a measurement surface that is not illustrated in more detail here. This is arranged for example on the rotor 18 or on an auxiliary component. When monitoring the bearing clearance, at least one of the distances, preferably both of them, are monitored and evaluated within the scope of condition monitoring. For the sake of simplicity, only a distance a is mentioned below.

Load states are generally understood to mean torques, forces, pressures, temperatures or else rotational speeds acting on the roller bearings 4A, 4B. These load states are in some cases derived load states from external loads applied to the bearing, specifically for example wind loads, as the main cause of varying load states. Different load states furthermore also result for example from load-free operation, operation at partial load and operation at full load. Different load states also result for example during startup, when the turbine and the roller bearing 4 are still at ambient temperature and all of the components of the bearing are virtually at the same temperature level and a following operating situation with an increased operating temperature. This is also characterized by temperature gradients between the individual components, which may lead to stresses etc. and therefore to different torques and forces.

FIGS. 2A, 2B each show a temporal profile of a load state L in the lower half of the image. This is illustrated in simplified form by a step function between two load states L1, L2. The load states change within a measurement time period ΔT. The measured distance a also changes in correlation with the varying load states L. This measured distance decreases in the exemplary embodiment by a distance difference Δa. This is also referred to as distance delta.

In order to sense the two distances a1, a2 in the load states L1, L2, two individual measurements at the time $t_1$ and $t_2$ are carried out in the starting state according to FIG. 2a. The measurement time period ΔT, that is to say the temporal distance between the two individual measurements, is for example in the region of minutes or else in the region of hours, depending on which time period is required for the two load states to change between the load states L1 and L2. The two individual measurements in this case define a first measuring series.

A second measuring series in the same load states L is thus carried out with the same load change at a temporal distance of for example several minutes, hours, days, weeks, months or else years. The load change illustrated here between two discrete load states L1, L2 is for example a load change upon startup of the turbine from the cold state to an operating temperature state (and with otherwise identical load conditions, such as for example wind loads).

FIG. 2B shows a situation after wear of the bearing has already occurred. This leads in principle to a situation whereby the difference Δa' between the distance values $a_1$', $a_2$' that are now measured has increased in comparison with the earlier state shown in FIG. 2A, in particular starting state.

The change in the difference Δa (change in the distance delta) is correlated with a change in the bearing clearance. The bearing clearance is therefore monitored and evaluated on the basis of this distance delta Δa. Depending on the change in the distance delta, appropriate measures are then taken and the bearing clearance is generally inferred.

If consideration is given to the load changes caused by wind loads in the case of a wind turbine, then this involves varying load changes—even in the case of average constant wind loads over for example a time period of several minutes—that are typically subject to a stochastic variation. This situation is illustrated in FIGS. 3A, 3B. FIG. 3A again shows the conditions in a starting state, and FIG. 3B shows the conditions after a certain operating time and wear.

The lower half of the image in each case shows the profile of the load state. A multiplicity of individual measurements are then carried out in the measurement time period ΔT, such that a profile of the distances a over time is determined. A virtually continuous profile of the distance values that vary with respect to the profile of the variation of the load states L is therefore determined by way of the multiplicity of measurements. Both the change in the load state L and that of the distances a are therefore time-dependent functions. The sensed values of the distance a are subjected to a statistical evaluation that leads to a statistical characteristic value that is a measure at least of the differences Δa between the distances a in the multiplicity of individual measurements. This statistical characteristic value is for example a mean value in the simplest case. A deviation, for example a standard deviation or a variance of the mean value, is however preferably used as characteristic value for the evaluation.

As is able to be seen with reference to the illustration in FIG. 3B that shows the situation after wear, wear in addition to a change in the mean value also leads to a considerable increase in the deviation or variance of the mean value. This (statistical) characteristic value is used, from starting parameters, to assess changes in the bearing clearance.

When carrying out the distance measurements, load-dependent influences caused by fabrication tolerances and fabrication deviations, such as axial run-out defects and concentricity defects, are overlaid onto the distance delta Δa. These fabrication deviations are in some cases greater than the load-induced distance changes.

One key aspect in the method is therefore considered to be that of correcting and revising the measured distance values a by such fabrication-induced distance variations.

Figure 4A:
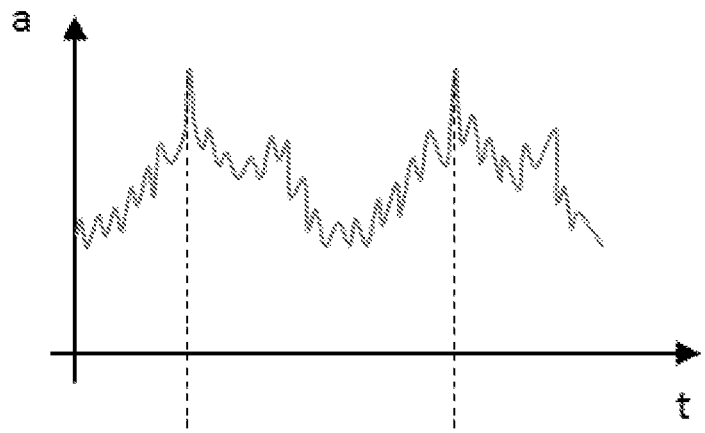
FIG. 4A shows the temporal profile of the distance between a rotating and a stationary part that has fabrication deviations.

For explanation purposes, FIG. 4A illustrates, by way of example, a profile of the distances a over time, specifically between the times t1, t2, which define precisely one period, that is to say one full revolution of the rotor 12 about the axis of rotation 16. At the times t1, t2, in each case clear upward deflections are able to be seen. These are brought about intentionally by corresponding markers in the form of elevations or indentations within the measurement surface.

FIG. 4A illustrates a profile in the case of sensing of a multiplicity of distances for at least one period, wherein the fabrication-induced distance changes are also overlaid in addition to load-dependent distance changes.

Figure 4B:
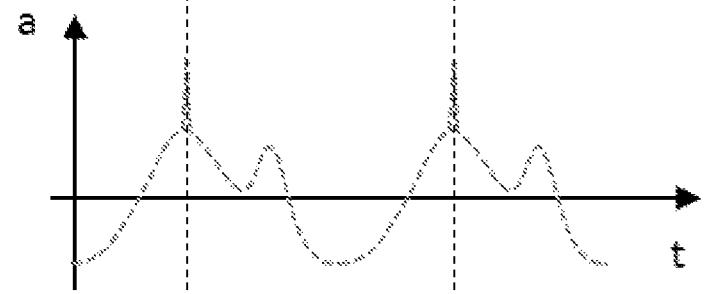
FIG. 4B shows the temporal profile of the distance of a reference measurement for determining the fabrication deviations and FIG. 4C shows the profile, illustrated in FIG. 4A, of the distance after correction by the fabrication deviations according to FIG. 4B.

FIG. 4B illustrates the profile of the distances a as a result of just fabrication deviations in the form of a reference curve. This reference measurement is in particular carried out in a load-free state.

Figure 4C:
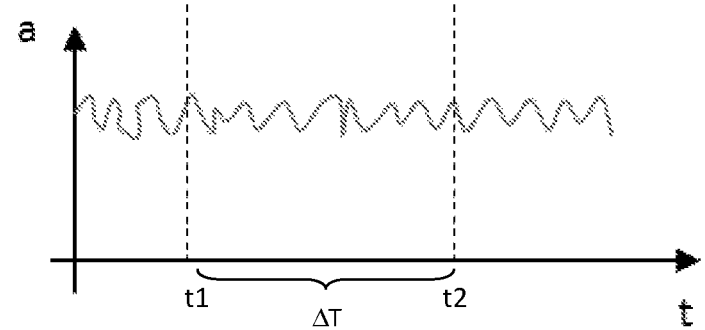

For the evaluation of the measured distance profile according to FIG. 4A in order to extract a distance profile that is purely load-induced, the measured distance profile (FIG. 4A) is corrected by the distance profile according to the reference curve (FIG. 4B). Specifically, the reference curve according to FIG. 4B is subtracted from the measured curve according to FIG. 4A. A purely load-induced distance profile is then obtained (corrected profile), as is illustrated by way of example in FIG. 4C. This is then used for the further evaluation. That is to say, at a later time, a corrected load-dependent profile is again determined within the scope of a second measuring series and, as described above, the two distance profiles are evaluated in terms of the changes in the differences between the distance values.

There is in principle the possibility and risk that the initially installation-induced or fabrication-induced deviations, such as axial run-out defects and concentricity defects, will change during operation. This may be caused for example by wear or releasing of preloading elements. Setting in mounting joints (for example bearing seat) also leads to a change in the concentricity and axial run-out. The profile and the development of the fabrication-induced deviations and distance changes are therefore expediently monitored or sensed. For this purpose, a new reference measurement is carried out, for example at recurring times after a certain operating time—for example in advance of a second measuring series. The reference profile determined in this new reference measurement is then subtracted from the distance profile measured in the second measuring series in order to obtain the pure load-induced profile of the distance values a. The corrected distance profiles according to the second measuring series are then evaluated—in a manner comparable to the method illustrated in FIG. 3A, 3B.

With regard to FIG. 2 and FIG. 3, it should also be noted that the average level of the distance a in the described exemplary embodiments increases (FIG. 2) or decreases (FIG. 3) with wear. The distance delta Δa however increases in both cases. Wear always leads to a larger distance delta Δa.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A method for monitoring a bearing clearance of a roller bearing that has a rotating part, and a stationary part comprising:
   within the scope of a first measuring series, sensing via a distance measurement via at least one distance sensor, a distance between a rotating part and a stationary part in at least two different recurring load states, wherein there is a difference between the measured distances,
   after sensing the first measuring series, the distance measurement for sensing the respective distance is repeated in the at least two recurring load states within the scope of a second measuring series,
   changes in a bearing clearance of the roller bearing are inferred on the basis of the changes in the difference between the measured distances in the two measuring series.

2. The method as claimed in claim 1, in which a change between the load states is sensed.

3. The method as claimed in claim 1, in which the different load states are adjusted.

4. The method as claimed in claim 1, in which during a respective measuring series over a specified measuring time period a multiplicity of distance measurements are carried out, and, a recurring load time behavior of the distances is sensed and evaluated with respect to the differences between the distances.

5. The method as claimed in claim 4, in which a statistical evaluation of the load time behavior of the distances is carried out and a statistical characteristic value is used as a measure for the difference between the measured distances, and this statistical characteristic value is monitored for changes.

6. The method as claimed in claim 1, in which a reference measurement is carried out in order to measure the distance between the rotating part and the stationary part over at least one revolution of the roller bearing in order to sense deviations in the roller bearing and to take the deviations into account in the measuring series, wherein the reference measurement is determined in a constant load state.

7. The method as claimed in claim 6, in which, in the reference measurement, the measured distances are sensed depending on an angle of rotation between the rotating part and the stationary part and the distances measured in the reference measurement are compared with those distances sensed after the reference measurement at the same angles of rotation.

8. The method as claimed in claim 7, wherein at least one mark is provided, and the mark is used to correlate the reference measurement and the distance measurements with one another.

9. The method as claimed in claim 8, in which the distance sensor measures against a measurement surface and the mark is designed as an indentation or elevation on the measurement surface.

10. The method as claimed in claim 1, wherein a plurality of distance sensors are arranged around a circumference, and a respective distance is measured to each distance sensor and the change in their distances is sensed.

11. The method as claimed in claim 10, in which a simultaneous mean value is sensed by sensing the distances from the plurality of distance sensors at the same time and forming a mean value therefrom.

12. The method as claimed in claim 11, wherein a phase shift of the individual sensor signals of the plurality of arranged distance sensors is carried out in order to determine fabrication deviation by bringing the signals into congruence.

13. The method as claimed in claim 10, in which the distances determined by the distance sensors are evaluated and averaged over a plurality of revolutions.

14. The method as claimed in claim 10, in which a distance profile is repeatedly modeled over one revolution from the measured distances from the distance sensors and is monitored for changes.

15. The method as claimed in claim 14, wherein a floating mean value of the distance profile is determined.

16. The method as claimed in claim 1, wherein a concentricity behavior and axial run-out behavior are monitored over time.

17. The method as claimed in claim 1, wherein at least one additional operating parameter selected from at least one of the operating parameters including power, rotational speed, load or temperature is used for identifying comparable operating states, in order to compare distance measured values of the same operating states.

18. The method as claimed in claim 1, in which the bearing clearance of the main bearing of a wind turbine is monitored.

19. A device having at least one distance sensor for measuring a distance between a rotating component and a stationary component of a roller bearing and having an evaluation apparatus which is designed to carry out a method having the following steps:

within the scope of a first measuring series using a distance measurement using at least one distance sensor, a distance between a rotating part and a stationary part is respectively sensed in at least two different recurring load states, wherein there is a difference between the measured distances, after the first measuring series is sensed, the distance measurement for sensing the respective distance is repeated in the at least two recurring load states within the scope of a second measuring series, changes in a bearing clearance of the roller bearing are inferred on the basis of the changes in the difference between the measured distances in the two measuring series.

* * * * *